(12) United States Patent
Patel

(10) Patent No.: US 9,797,104 B2
(45) Date of Patent: Oct. 24, 2017

(54) BIODEGRADABLE CONTAINERS

(71) Applicant: Vijay C. Patel, Rancho Santa Margarita, CA (US)

(72) Inventor: Vijay C. Patel, Rancho Santa Margarita, CA (US)

(*) Notice: Subject to any disclaimer, the term of this patent is extended or adjusted under 35 U.S.C. 154(b) by 0 days.

(21) Appl. No.: 15/261,537

(22) Filed: Sep. 9, 2016

(65) Prior Publication Data

US 2017/0073913 A1 Mar. 16, 2017

Related U.S. Application Data

(60) Provisional application No. 62/216,844, filed on Sep. 10, 2015.

(51) Int. Cl.
| | | |
|---|---|---|
| *E01H 1/12* | (2006.01) | |
| *B65D 33/00* | (2006.01) | |
| *B65D 33/08* | (2006.01) | |
| *B65D 33/18* | (2006.01) | |
| *C08L 3/02* | (2006.01) | |

(52) U.S. Cl.
CPC .......... *E01H 1/1206* (2013.01); *B65D 33/002* (2013.01); *B65D 33/08* (2013.01); *B65D 33/18* (2013.01); *C08L 3/02* (2013.01)

(58) Field of Classification Search
CPC ....... E01H 1/1206; C08L 3/02; B65D 33/002; B65D 33/08; B65D 33/18
See application file for complete search history.

(56) References Cited

U.S. PATENT DOCUMENTS

| | | | | |
|---|---|---|---|---|
| 2009/0315349 | A1* | 12/2009 | Black | E01H 1/1206 294/1.3 |
| 2011/0178196 | A1* | 7/2011 | Steinke | C08L 97/02 521/135 |
| 2012/0135169 | A1* | 5/2012 | Tangelder | C08L 3/02 428/35.2 |

* cited by examiner

*Primary Examiner* — Michael C Miggins
(74) *Attorney, Agent, or Firm* — Snell & Wilmer L.L.P.

(57) ABSTRACT

Biodegradable bags for disposing of a unwanted substance are formed from a bioplastic material made from a bio based material in the form of a maize flour, and a biodegradable plasticizer selected from the group consisting of vegetable oil, polyesters made from glycerin, glycerin, derivatives of glycerin, and combinations thereof. The maize flour comprises a minor volume percent of the total volume of the bioplastic material. A biodegradable additive is used to provide a degree of stiffness to the material, a preferred additive being polylactic acid. A UV stabilizer may optionally be included. Biodegradable bags have an open end and a closed end with a sidewall extending therebetween. The bag includes a feature for enclosing a substance once placed into the bag. In an example, the feature comprises an opening through a sidewall. Alternatively, the feature may include an adhesive section.

20 Claims, 4 Drawing Sheets

BIODEGRADABLE CONTAINERS

CROSS-REFERENCE TO RELATED APPLICATIONS

This patent application claims the benefit of U.S. Provisional Patent Application No. 62/216,844, filed on Sep. 10, 2015, which is hereby incorporated by reference in its entirety.

FIELD

Biodegradable containers are disclosed herein and, more particularly, containers in the form of bags that are biodegradable/compostable formed from a bioplastic material and that can be used to gather and dispose of a variety of different substances.

BACKGROUND

Conventional plastic bags such as those used to collect and dispose of pet waste are well known. Two major problems associated with handling pet waste are pet waste pollution, and the disposal of pet waste in plastic bags. With respect to pet waste pollution, the U.S. Environmental Protection Agency (EPA) classifies pet waste (e.g., from dogs and cats) as a dangerous pollutant in the same category of toxic chemicals and oils. Pet waste, e.g., dog waste, left on the street or lawn does not just go away or fertilize the grass. The bacteria in dog waste is often washed down storm drains and into ditches, streams, lakes, inlets and oceans and can travel for miles in the water. Cat waste dumped outside can also be washed into the water. The bacteria in pet waste can make it unsafe to harvest shellfish or swim in our waters. A day's waste from one large dog can contain 7.8 billion fecal coliform bacteria, enough to close 15 acres of shellfish beds.

The U.S. Center for Disease Control and Prevention (CDC) confirms that pet waste contains ringworms, tapeworms and salmonella. When infected dog waste comes into contact with lawn, the waste (feces) will eventually disappear, but the parasite eggs can linger for years. When a human or animal comes into contact with that lawn, through everyday activities like walking barefoot, gardening or playing, they risk infection from those eggs even years after the feces is gone. Pet waste contains *e. coli* and other harmful bacteria including fecal coliform bacteria, which can cause serious kidney disorders, intestinal illness, cramps and diarrhea in humans. There are 23 million fecal coliform bacteria in a single gram of pet waste.

Additionally, dog waste often contains roundworm larvae, which can cause blindness. If a human ingests a roundworm larva, it can migrate through the body causing disease to the brain, lungs, kidneys, liver, heart or eyes. So when people (especially children) touch soil, dog toys or anything that has been in contact with dog feces and then touch their mouths or other open areas, they can become infected.

With respect to the disposal of pet waste in plastic bags, America's 83 million pet dogs produce some 10.6 million tons of waste every year. The Environmental Health Division of Thurston County Public Health and Social Services and other City Municipalities encourage pet owners to "scoop it, bag it, trash it" when referring to the pet waste from their pets. At home, durable plastic bags are used for dog waste or kitty litter and are tied securely and placed in a garbage can.

Today, cleaning up after your pet (e.g., dog) using a durable plastic bag is the urban norm, but it's not enough. Over the last century, plastic has taken over the planet. While plastics can be used and recycled wisely, the majority of those produced are not recycled wisely. Perhaps no other item symbolized the problems of our throw away culture more than the single-use plastic bag and are resulting in a range of environmental impacts and problems as it takes 1 second to produce, around 1 minute to use, more than 1 century to destroy!

Worldwide, a trillion single-use plastic bags are used each year, nearly 2 million each minute. Usage varies widely among countries, from over 400 a year for many, to just a four a year for people in Denmark and Finland. Americans use on average nearly one plastic bag each day, taking something made from fossil fuel formed over millions of years and generally using it for mere minutes before throwing it away. The energy required to make 12 plastic bags can drive a car a mile.

Plastic pollution involves the accumulation of plastic bag products in the environment that adversely affects wildlife, wildlife habitat and humans. Plastic that acts as pollutants are categorized into macro, mesa or micro debris, based on size. The prominence of plastic pollution is correlated with plastics being inexpensive and durable, which leads to high levels of plastics used by humans. However, plastic is slow to degrade. Humans are also affected by plastic pollution, such as through disruption of the thyroid hormone axis or sex hormone levels.

Given the multitude of problems associated with plastic bags, which are the most common plastic products disposed of everywhere; many communities around the world have attempted to free themselves from their addiction and use of plastic bags by implementing bag bans or fees. The oldest existing bag tax is in Denmark, which was passed in 1993. One of the most well-known bag measures is Ireland's national bag tax, which was adopted in 2002. Indeed, many communities have implemented plastic bag reduction measures. Throughout the European Union, many member states will soon be required to take measures to reduce plastic bag use by 80 percent by 2019. The State of California is considering passing the first state ban on plastic bags, and one of the loudest concerns comes from pet owners asking: "How will we scoop our dog's poop?"

It is therefore desired that a container be developed for the purposes of collecting unwanted substances, such as pet waste, that is not primarily derived from fossil fuels, e.g., is formed from renewable biomass resources, that is biodegradable/compostable into biomass, that functionally is as good as or better than using conventional plastic bags, and that has a reduce environmental impact, e.g., a lower carbon footprint.

SUMMARY

Biodegradable containers/bags disclosed herein for disposing of a substance are formed from a bioplastic material. In an example, the bioplastic material comprises a bio based material in the form of maize flour, and biodegradable plasticizer selected from the group consisting of vegetable oil, polyesters made from glycerin, glycerin, derivatives of glycerin, and combinations thereof. In an example, the maize flour comprises a minor volume percent of the total volume of the material. The maize flour may be present in an amount of from about 10 to 45 percent by volume, and about 25 to 35 percent by volume of the total bioplastic material. In an example, the biodegradable plasticizer may be present in an amount of from about 40 to 75 percent by volume, and about 55 to 65 percent by volume of the total bioplastic material.

The bioplastic material further includes a biodegradable additive such as one useful for adding a desired degree of stiffness to the resulting material, wherein a preferred biodegradable additive is polylactic acid. In an example, the polylactic acid may be present in an amount of from about 1 to 10 percent by volume of the total bioplastic material. In an example, the bioplastic may include an optional UV stabilizer, e.g., in an amount of from about 1 to 5 percent by volume of the total bioplastic material.

Biodegradable containers/bags as disclosed herein comprise an open end and a closed end opposite the open end with a sidewall extending therebetween. The bag includes a feature disposed along an outside surface of the sidewall for enclosing a substance once placed into the bag. In an example, the feature comprises an opening through a sidewall. Alternatively, the feature may include an adhesive section.

Biodegradable containers as disclosed herein made from such bioplastic material is biodegradable/compostable into biomass, and performs to pick up and contain a substance for disposal that is functionally as good as or better than using conventional plastic bags, while having a reduced environmental impact and lower carbon footprint.

BRIEF DESCRIPTION OF THE DRAWINGS

These and other features and advantages of bioplastic containers as disclosed herein will be appreciated as the same becomes better understood by reference to the following detailed description when considered in connection with the accompanying drawings wherein.

DESCRIPTION

Figure 1:
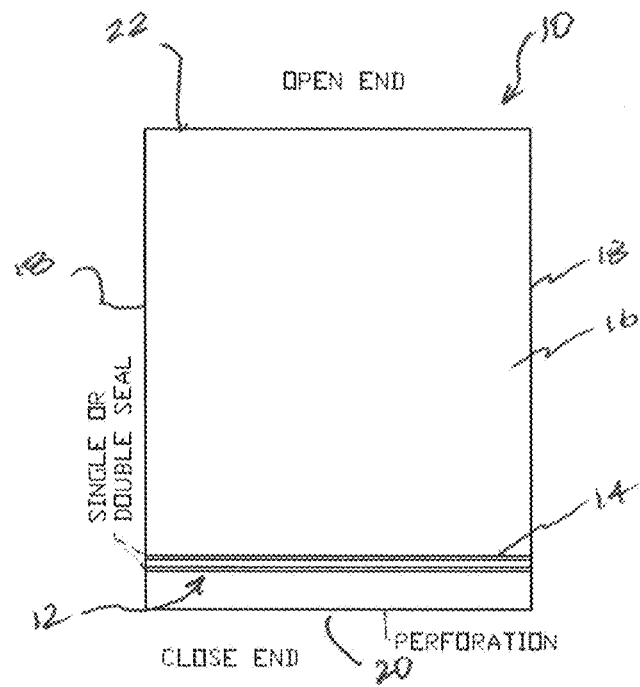
FIG. 1 is a side view of an example bioplastic container as disclosed herein.

Bioplastic containers as disclosed herein are specially engineered to replace conventional plastic bags for the purpose of disposing of unwanted substances, e.g., pet waste and the like, and do so in a manner that does not derive exclusively on fossil fuels, leaving a reduced carbon footprint, and that is biodegradable/compostable into biomass by soil microflora. In a particular example, bioplastic containers as disclosed herein may be provided in the form of flexible bags that are molded or other otherwise formed using conventional techniques known in the art.

The history of bioplastic materials is not a long one. An alternative material to plastics is desired to be more responsible in taking care of the world we live in. Various reasons are associated with the research and development of biopolymers and bioplastics. Bioplastic can replace conventional plastic in the field of their applications and can be used in different sectors including pet waste pick-up bags, and other plastic or composite material items we are buying and therefore can help in making them environmentally sustainable.

Common plastics, such as fossil fuel plastics are derived from oil or natural gas. Production of such plastics tends to require more fossil fuels and to produce more greenhouse gases than the production of bio-based polymers. Some but not all bioplastics are designed to biodegrade. The use of bioplastics could markedly increase as durable versions are developed, and as the cost to manufacture these bioplastics continues to fall. There is an increase of approximately 20% in the production of bioplastics per year. The market was around 1.2 million tons in 2011 and may see a five-fold increase in production in the coming years.

In the search for new material solutions, while keeping an eye on the goal of truly sustainable products and consumption, bioplastics have several advantages. The use of renewable resources to produce bioplastics is the key for increasing resource efficiency. The resources can be cultivated on an annual basis, the principle of cascade use, as biomass can first be used for materials and then for energy generation, reduction of the carbon footprint and GHG emissions of same materials and products saving fossil resources.

A variety of natural, synthetic, and biosynthetic polymers are bio and environmentally degradable. A polymer based on a C—C backbone (carbon bond) tends to resist degradation, whereas heteroatom-containing polymer backbones confer biodegradability.

The family of bioplastics is roughly divided into three main groups:

(1) Compostable Plastics: Also called bio-based biodegradable/compostable plastics, made from biomass/plant feed stocks and designed to be completely biodegradable in the targeted disposal environment (composting, soil, marine, anaerobic digester) in a short defined time period and decomposed into $CO_2$ (aerobic) or $CO_2+CH_4$ (anaerobic), water and biomass by soil microflora (nutrients) and satisfy the requirements of ASTM D6400, EN 13432 or ISO 14855 as determined by an approved, independent third-party laboratory.

(2) Vegetal Plastics: Also called bio-based or partly bio-based made from renewable resources and could be non-biodegradable (durable) or compostable.

(3) Fragmented Plastics: Also called OXO Plastics or organic additive based plastics added 1-2% levels in fossil based polymers and are claimed to be biodegradable.

Bioplastic containers as disclosed herein are bio-based, biodegradable/compostable bioplastic containers, which may be used to collect and dispose of a number of unwanted substances. In an example, the unwanted substance can be pet waste, and bioplastic containers as disclosed herein may be used as waste pick-up bags for pets including dogs and cats. The bioplastic containers may have a number of different configurations, e.g., with different shapes, styles and/or handles to facilitate the disposal of waste safely and in an environmentally sustainable manner, thereby resulting in better stewardship for pets, people and the planet, we live on.

An advantage of bioplastic containers as disclosed herein is that they are made from bio based materials such as Biolice or equivalent with the blend of maize flour up to about 35% by volume and one or more biodegradable/compostable plasticizers, which may include vegetable oil, glycerin or glycerol, glycerin or glycerol derivatives, glycerin or glycerol as reacted with either organic or inorganic acids to form a polyester. In an example, bioplastic containers as disclosed herein are formed from a bioplastic material that further includes a biodegradable additive such as a biodegradable polyester such as polylactic acid (PLA), wherein a desired feature of the resulting bioplastic material as disclosed herein is that it is not made from fossil fuel derivate materials. A further advantage is that bioplastic containers as disclosed herein made from Biolice or equivalent modified materials provide an inexpensive bioplastic per waste pick-up bags, which are biodegradable under aerobic or anaerobic conditions and compostable in home or industrial composting facility, they are equivalent or better than related products in function and performance, and that they are safe and convenient to use and carry pet waste to a waste collector while also protecting the user while picking up the waste.

In an example, bioplastic containers or bags as disclosed herein have a material composition made of the blend of a bio-based material in the form of a maize flour, and a biodegradable plasticizer, e.g., that may be vegetable oil, glycerin, polyesters made from glycerin, or other glycerin derivatives, wherein the maize flour may comprise from about 10 to 45 volume percent, about 20 to 40 volume percent, about 25 to 35 volume percent, and an example approximately 35 volume percent, and the biodegradable plasticizer may comprise from about 40 to 75 percent by volume, about 50 to 70 percent by volume, about 55 to 65 percent by volume, and in an example approximately 65 percent by volume based on the total volume of the blend. In an example, the blend additionally includes a biodegradable additive such as a biodegradable polyester or the like, preferably PLA, from about 1 to 10 percent by volume, from about 2 to 8 percent by volume, and in an example from about 3 to 5 percent by volume based on the total volume of the blend. The biodegradable additive is useful for adding a desired degree of stiffness or rigidity to the container formed from the material. UV stabilizers may also optionally be used from about 1 to 5 percent by volume, 2 to 4 percent by volume, and in an example approximately 2 percent by volume based on the total volume of the blend. Other additives such as colorants, tinting agents, and/or and fillers may also be optionally present, e.g., in the event that it is desired to have a colored container.

In an example, extrusion grade Biolice produced from Limagrain may be used, and this is the maize flour component. Example biodegradable plasticizers useful for making biodegradable containers include those that are vegetable oil, glycerin, and/or derivatives of glycerin and that are biodegradable/compostable biopolymer. An example a biodegradable additive may be selected from the group of biodegradable polyesters, and in a preferred embodiment is PLA, which may be used as an additive to improve stiffness or reduce flexibility, depending on the particular end-use application. Example UV stabilizers that may be used in biodegradable containers as disclosed herein include those conventionally used to form plastic materials and films, and specific examples useful for making bioplastic containers as disclosed herein include those material having a primary function of protecting the container from the long-term UV degradation effects from ultraviolet radiation. Different UV stabilizers may be utilized depending upon the material selected to make the containers, intended functional life, and sensitivity to UV degradation. UV stabilizers, such as benzophenones, work by absorbing the UV radiation and preventing the formation of free radicals. Depending upon substitution, the UV absorption spectrum is changed to match the application.

More preferably, the blend includes between about 25 to 35 percent by volume of maize flour, about 55 to 65 percent by volume of biodegradable plasticizer, and about 2 to 8 percent by volume of the biodegradable additive such as PLA based on the total volume of the blend. This blend advantageously provides an optimal degree of durability, strength and degradability of the bio-based, biodegradable/compostable bioplastic waste pick-up bags.

The following material blend compositions are provided for purposes of reference as being useful in forming bioplastic containers as disclosed herein:

Blend 1

A first blend comprises up to about 35 volume percent maize flour, and up to about 65 volume percent biodegradable plasticizer (that may be vegetable oil, glycerin or made/derived from glycerin) based on the total volume of the blend. In an example, these materials are combined together and then are introduced into an extruder.

Blend 2

A bioplastic material as disclosed herein comprises up to about 35 volume percent maize flour, e.g., about 25 to 35 percent by volume, up to about 60 volume percent, e.g., about 55 to 65 percent by volume, biodegradable plasticizer (that may be vegetable oil, glycerin or made/derived from glycerin), and up to about 5 percent by volume, e.g., about 2 to 5 percent by volume, of a biodegradable additive in the form of PLA based on the total volume of the blend.

Blend 3

Another bioplastic material as disclosed herein comprises up to about 35 volume percent maize flour, e.g., about 25 to 35 percent by volume, up to about 60 volume percent, e.g., about 55 to 65 percent by volume, biodegradable plasticizer (that may be vegetable oil, glycerin or made/derived from glycerin), up to about 3 percent by volume, e.g., about 1 to 3 percent by volume PLA, and up to about 2 percent by volume, e.g., about 1 to 2 percent by volume, UV stabilizer based on the total volume of the blend.

Bioplastic containers/bag as disclosed herein having the above-noted bioplastic material composition are engineered to advantageously provide properties of optimal durability, strength and degradability well suited for such bio-based, biodegradable/compostable bioplastic containers, e.g., waste pick-up bags.

Bioplastic containers as disclosed herein, made having the above-described material compositions, display the following material characteristics:

Material Characteristics

| | |
|---|---|
| Source of Material | Renewable Biomass Resources |
| Type of Material | Truly Renewable, biodegradable |
| Carbon Emitter | Low |
| $CO_2$ Sequestration | Yes |
| Oxygen Generation | Yes |
| Cost Input | Low |
| Water Consumption | Low (Approx. 238 L per 1 KG of forage maize) |
| Renewable Energy Generation | Yes |
| Suitable for Biomass | Yes |
| Landfill Hazard | Low |
| Availability of Source Material | Widely Available and Naturally Distributed |
| Supply of Source Material | Abundant |
| Environmentally Sustainable | Yes |

Bioplastic containers as disclosed herein may be made having a variety of different configurations depending on the particular end use application.

FIGS. 1 to 7 are provided by way or reference to illustrate examples of bioplastic containers as configured to accommodate the end use application of picking up and disposing of pet waste. While such embodiments of the bioplastic containers for such particular end-use application have been illustrated, bioplastic containers as disclosed herein made from the bioplastic material constructions disclosed configured differently than that illustrated are understood to be within the scope and spirit of the disclosure.

FIG. 1 illustrates an example bioplastic container 10 in the form of a bag comprising a closed end 12 positioned along a bottom portion of the container, wherein the closed end 12 may be formed by a single or double seal 14 between two opposed sheets 16 of the bioplastic material, and wherein side portions 18 of the container are also sealed in a conventional fashion. If desired, the closed end may include a perforated section 20 to facilitate providing a number of such containers in a roll or the like for dispensement of a single container by removing from an adjacent container via the perforated section 20. Such example may be used by a user placing their hand into the bag via an open end 22 and inverting the bag over the user's hand and collecting the unwanted substance, e.g., pet waste. Once the unwanted substance is collected, the bag is inverted and removed from the user's hand, and portion of the bag adjacent the top not containing the unwanted substance may be twisted or tied in a knot for disposal in a waste receptacle or the like.

Figure 2:
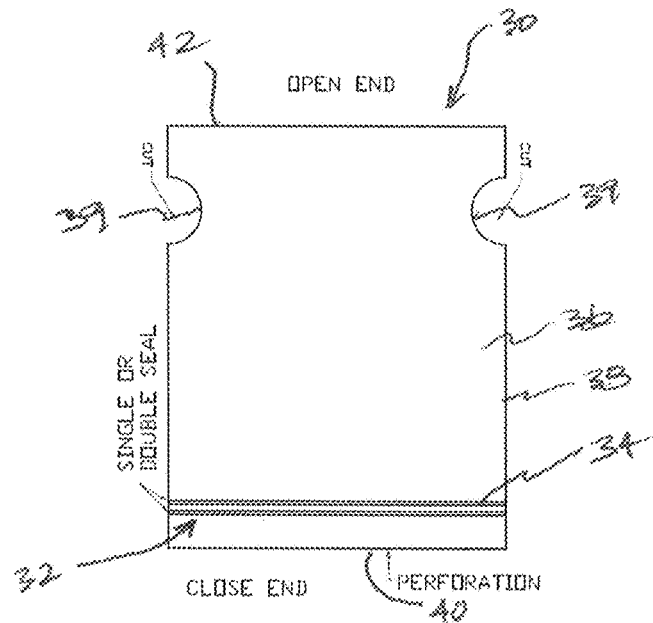
FIG. 2 is a side view of another example bioplastic container as disclosed herein.

FIG. 2 illustrates an example bioplastic container 30 in the form of a bag comprising a closed end 32 positioned along a bottom portion of the container, wherein the closed end 32 may be formed by a single or double seal 34 between two opposed sheets 36 of the bioplastic material, and wherein side portions 38 of the container are also sealed in a conventional fashion. Unlike the example of FIG. 1, this example includes cut-out sections 39 along the side section that are not sealed together and that are positioned adjacent the open end 42. If desired, the closed end may include a perforated section 40 to facilitate providing a number of such containers in a roll or the like for dispensement of a single container by removing from an adjacent container via the perforated section 40. Such example may be used by a user placing their hand into the bag via the open end 42 and inverting the bag over the user's hand and collecting the unwanted substance, e.g., pet waste. Once the unwanted substance is collected, the user pulls the portion of the bag through one of the cut-out sections 39 as the bag is being inverted and removed from the user's hand. Configured in this manner, the cut-out section through which the portion of the bag containing the collected unwanted substance operates to enclose the collected unwanted substance for disposal in a waste receptacle or the like, and the other cut out section may be used as a handle.

Figure 3:
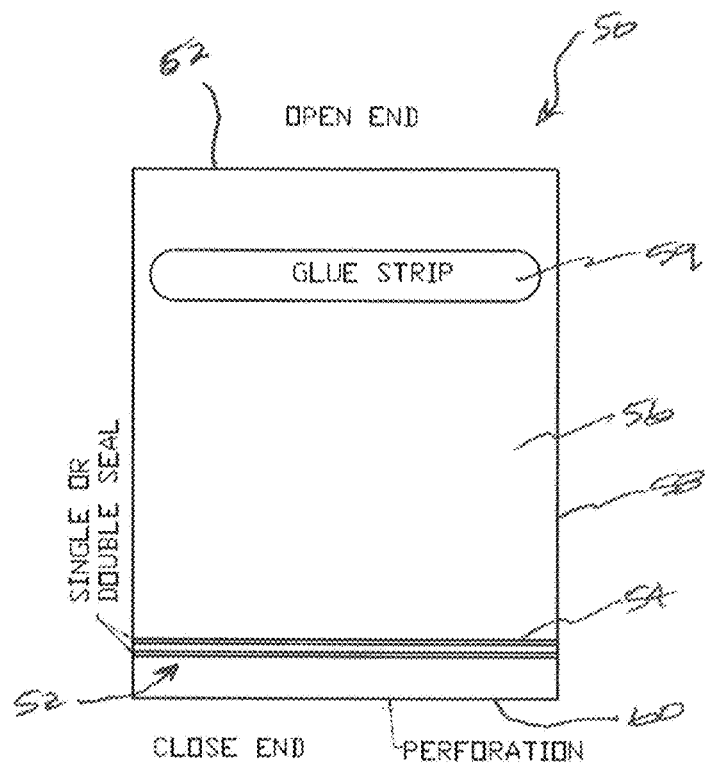
FIG. 3 is a side view of another example bioplastic container as disclosed herein.

FIG. 3 illustrates an example bioplastic container 50 in the form of a bag comprising a closed end 52 positioned along a bottom portion of the container, wherein the closed end 52 may be formed by a single or double seal 54 between two opposed sheets 56 of the bioplastic material, and wherein side portions 58 of the container are also sealed in a conventional fashion. This example includes a glue or adhesive section 59 positioned along an outside surface of the container that may be adjacent the open end 52. If desired, the closed end may include a perforated section 60 to facilitate providing a number of such containers in a roll or the like for dispensement of a single container by removing from an adjacent container via the perforated section 60. Such example may be used by a user placing their hand into the bag via the open end 52 and inverting the bag over the user's hand and collecting the unwanted substance, e.g., pet waste. Once the unwanted substance is collected, the user pulls the collected substance through the bag and removes their hand through the open end. The side of the bag containing the adhesive section is then folded down over the portion of the bag retaining the collected substance and pressed against an outside surface of the bag to form a seal to enclose the collected unwanted substance for disposal in a waste receptacle or the like.

Figure 4:
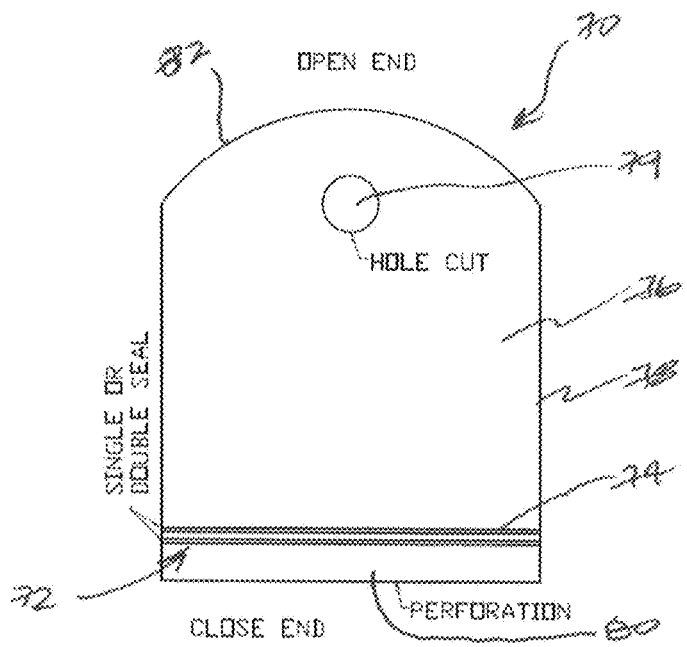
FIG. 4 is a side view of another example bioplastic container as disclosed herein.

FIG. 4 illustrates an example bioplastic container 70 in the form of a bag comprising a closed end 72 positioned along a bottom portion of the container, wherein the closed end 72 may be formed by a single or double seal 74 between two opposed sheets 76 of the bioplastic material, and wherein side portions 78 of the container are also sealed in a conventional fashion. Unlike the example of FIG. 1, this example includes an opening 79 disposed through one or both of the opposed sheets and that may be positioned adjacent the open end 72. If desired, the open end may be configured having a nonplanar or curved shape. If desired, the closed end may include a perforated section 80 to facilitate providing a number of such containers in a roll or the like for dispensement of a single container by removing from an adjacent container via the perforated section 80. Such example may be used by a user placing their hand into the bag via the open end 82 and inverting the bag over the user's hand and collecting the unwanted substance, e.g., pet waste. Once the unwanted substance is collected, the user pulls the portion of the bag through the opening 79 as the bag is being inverted and removed from the user's hand. Configured in this manner, the opening 79 through which the portion of the bag containing the collected unwanted substance operates to enclose the collected unwanted substance for disposal in a waste receptacle or the like, and a remaining opening may be used as a handle.

Figure 5:
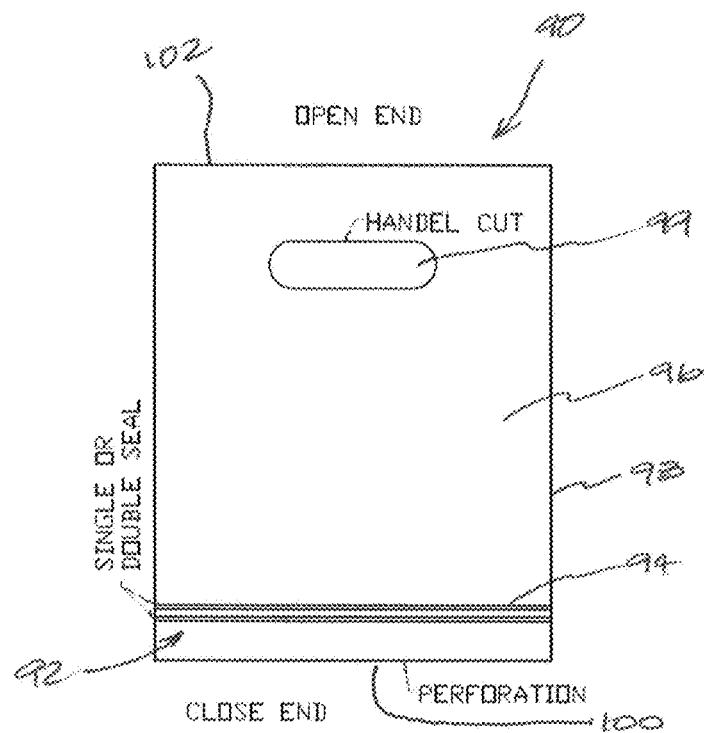
FIG. 5 is a side view of another example bioplastic container as disclosed herein.

FIG. 5 illustrates an example bioplastic container 90 in the form of a bag comprising a closed end 92 positioned along a bottom portion of the container, wherein the closed end 92 may be formed by a single or double seal 94 between two opposed sheets 96 of the bioplastic material, and wherein side portions 98 of the container are also sealed in a conventional fashion. Unlike the example of FIG. 1, this example includes an handle opening 99 disposed through one or both of the opposed sheets and that may be positioned adjacent the open end 102. If desired, the closed end may include a perforated section 100 to facilitate providing a number of such containers in a roll or the like for dispensement of a single container by removing from an adjacent container via the perforated section 100. Such example may be used by a user placing their hand into the bag via the open end 92 and inverting the bag over the user's hand and collecting the unwanted substance, e.g., pet waste. Once the unwanted substance is collected, the user pulls the portion of the bag through the handle opening 99 as the bag is being inverted and removed from the user's hand. Configured in this manner, the handle opening 99 through which the portion of the bag containing the collected unwanted substance operates to enclose the collected unwanted substance for disposal in a waste receptacle or the like. In an example, the container comprise two handle openings disposed through each of the opposed sheets 96, so that the remaining handle opening may be used by the user to carry the container after collecting and enclosing the unwanted substance therein.

Figure 6:
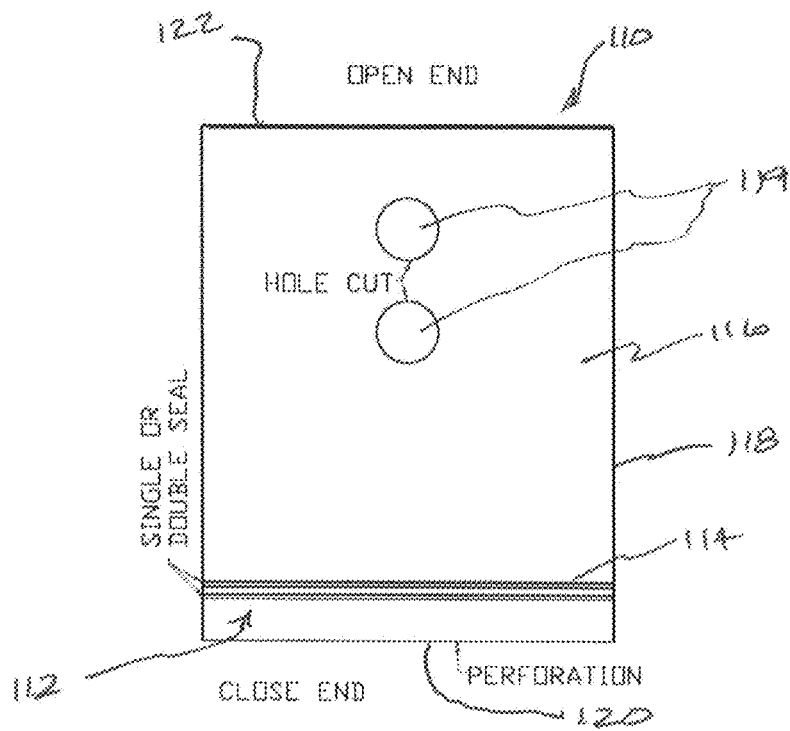
FIG. 6 is a side view of another example bioplastic container as disclosed herein.

FIG. 6 illustrates an example bioplastic container 110 in the form of a bag comprising a closed end 112 positioned along a bottom portion of the container, wherein the closed end 112 may be formed by a single or double seal 114 between two opposed sheets 116 of the bioplastic material, and wherein side portions 118 of the container are also sealed in a conventional fashion. Unlike the example of FIG. 1, this example includes a pair of openings 119 positioned in a stacked vertical orientation relative to the open end 122 disposed through one of the opposed sheets and that may be positioned adjacent the open end 122. If desired, the closed end may include a perforated section 120 to facilitate providing a number of such containers in a roll or the like for dispensement of a single container by removing from an adjacent container via the perforated section 120. Such example may be used by a user placing their hand into the bag via the open end 122 and inverting the bag over the user's hand and collecting the unwanted substance, e.g., pet waste. Once the unwanted substance is collected, the user inverts their hand from the container leaving the unwanted substance disposed along the closed end 112, and pulls an opposed sheet through one of the opposed openings 119 to enclose the collected unwanted substance for disposal in a waste receptacle or the like. If desired, the portion of the sheet pulled through the one opening 119 may be looped through the adjacent opening 119 to provide an additional degree of entrapment of the unwanted substance within the container.

Figure 7:
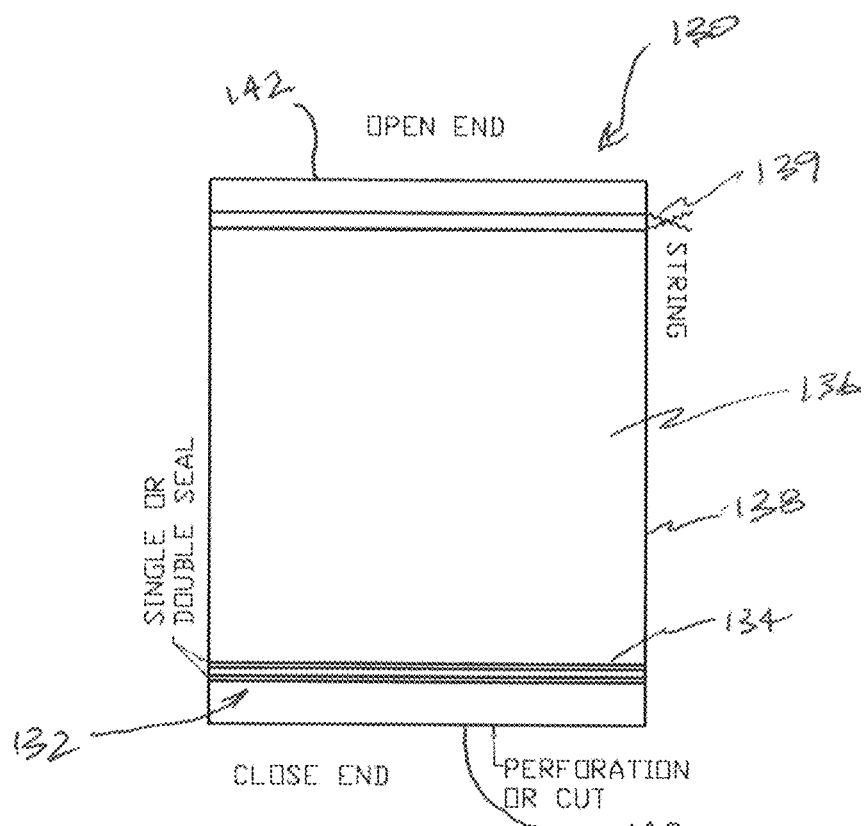
FIG. 7 is a side view of another example bioplastic container as disclosed herein.

FIG. 7 illustrates an example bioplastic container 130 in the form of a bag comprising a closed end 132 positioned along a bottom portion of the container, wherein the closed end 132 may be formed by a single or double seal 134 between two opposed sheets 136 of the bioplastic material, and wherein side portions 138 of the container are also sealed in a conventional fashion. The container may include a gathering element 139 such as a draw string or the like adjacent the closed end 132 configured for gathering and closing the open end 142. If desired, the closed end may include a perforated section 140 to facilitate providing a number of such containers in a roll or the like for dispensement of a single container by removing from an adjacent container via the perforated section 140. Such example may be used by a user placing their hand into the bag via the open end 142 and inverting the bag over the user's hand and collecting the unwanted substance, e.g., pet waste. Once the unwanted substance is collected, the bag is inverted and removed from the user's hand, and a portion of the bag adjacent the top not containing the unwanted substance may be closed drawing or otherwise engaging the gathering element 139 for enclosing the collected unwanted substance in the bag for disposal in a waste receptacle or the like.

Although only a few example embodiments of bioplastic materials and containers made therefrom have been described in detail above, those skilled in the art will readily appreciate that many modifications are possible in the example embodiments without materially departing from the concepts as disclosed herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A biodegradable bag for disposing of a substance, wherein the bag is formed from a bioplastic material consisting essentially of:
   a bio based material in the form of a maize flour;
   a biodegradable plasticizer selected from the group consisting of vegetable oil, polyesters made from glycerin, glycerin, derivatives of glycerin, and combinations thereof;
   a biodegradable additive in the form of polylactic acid to improve stiffness of the final material;
   wherein the maize flour comprises a minor volume percent of the total volume of the bioplastic material.

2. The biodegradable bag as recited in claim 1 wherein the bioplastic material consists of the flour, the biodegradable plasticizer, and the biodegradable additive.

3. The biodegradable bag as recited in claim 1 wherein the polylactic acid is present in an amount of from about 1 to 10 percent by volume of the total bioplastic material.

4. The biodegradable bag as recited in claim 1 wherein the polylactic acid is present in an amount of from about 3 to 8 percent by volume of the total bioplastic material.

5. The biodegradable bag as recited in claim 1 wherein the biodegradable plasticizer is present in an amount of from about 40 to 75 percent by volume of the total bioplastic material.

6. The biodegradable bag as recited in claim 1 wherein the biodegradable plasticizer is present in an amount of from about 55 to 65 percent by volume of the total bioplastic material.

7. The biodegradable bag as recited in claim 1 wherein the bioplastic material further comprises a UV stabilizer.

8. The biodegradable bag as recited in claim 7 wherein the UV stabilizer is present in an amount of from about 1 to 5 percent by volume of the total bioplastic material.

9. The biodegradable bag as recited in claim 1 wherein the maize flour is present in an amount of from about 10 to 45 percent by volume of the total bioplastic material.

10. The biodegradable bag as recited in claim 9 wherein the maize flour is present in an amount of from about 25 to 35 percent by volume of the total bioplastic material.

11. The biodegradable bag as recited in claim 1 comprising an open end and a closed end opposite the open end with a sidewall extending therebetween, and wherein the bag includes a feature disposed along an outside surface of the sidewall for enclosing a substance once placed into the bag.

12. The biodegradable bag as recited in claim 11 wherein the feature comprises an opening through a sidewall.

13. The biodegradable bag as recited in claim 11 wherein the feature includes an adhesive section.

14. A biodegradable bag for disposing of a substance, wherein the bag is made from a bioplastic material consisting essentially of:
   10 to 40 percent by volume of a bio based material in the form of a maize flour based on the total volume of the bioplastic material;
   40 to 75 percent by volume of biodegradable plasticizer selected from the group consisting of vegetable oil, polyesters made from glycerin, glycerin, derivatives of glycerin, and combinations thereof, based on the total volume of the bioplastic material;

1 to 10 percent by volume of a biodegradable additive that is polylactic acid; and
a UV stabilizer.

15. The biodegradable bag as recited in claim 14 wherein the bioplastic material consists of the flour, the biodegradable plasticizer, the biodegradable additive, and the UV stabilizer.

16. The biodegradable bag as recited in claim 14 wherein the UV stabilizer is present in an amount of from about 1 to 5 percent by volume of the total bioplastic material.

17. The biodegradable bag as recited in claim 14 wherein the bioplastic material comprises up to 35 percent by volume of the maize flour, and 55 to 65 percent by volume of the biodegradable plasticizer.

18. The biodegradable bag as recited in claim 14 wherein the wherein the bioplastic material comprises up to 35 percent by volume of the maize flour, and up to 60 percent by volume of the biodegradable plasticizer, and about 5 percent by volume of the biodegradable additive based on a total volume of the bioplastic material.

19. The biodegradable bag as recited in claim 14 wherein the wherein the bioplastic material comprises up to 35 percent by volume of the maize flour, and up to 60 percent by volume of the biodegradable plasticizer, about 3 percent by volume of the biodegradable additive, and about 2 percent by volume of the UV stabilizer based on a total volume of the bioplastic material.

20. The biodegradable bag as recited in claim 14 comprising an open end and a closed end opposite the open end with a sidewall extending therebetween, and wherein the bag includes a feature disposed along an outside surface of the sidewall for enclosing a substance once placed into the bag.

* * * * *